(12) United States Patent
Duran

(10) Patent No.: US 8,433,579 B1
(45) Date of Patent: Apr. 30, 2013

(54) VOICE-ACTIVATED MOTORIZED REMOTE CONTROL DEVICE

(76) Inventor: Roberto Duran, North Hills, CA (US)

( * ) Notice: Subject to any disclaimer, the term of this patent is extended or adjusted under 35 U.S.C. 154(b) by 759 days.

(21) Appl. No.: 12/693,312

(22) Filed: Jan. 25, 2010

(51) Int. Cl.
G10L 21/00 (2006.01)

(52) U.S. Cl.
USPC ............ 704/275; 446/436; 446/437; 446/465

(58) Field of Classification Search .................. 704/275; 446/436, 437
See application file for complete search history.

(56) References Cited

U.S. PATENT DOCUMENTS

| 5,267,323 | A | 11/1993 | Kimura |
| 5,777,571 | A | 7/1998 | Chuang |
| D423,510 | S | 4/2000 | Pizarro et al. |
| 6,046,565 | A | 4/2000 | Thorne |
| 6,573,832 | B1 | 6/2003 | Fugere-Ramirez |
| 6,665,639 | B2 | 12/2003 | Mozer et al. |
| 6,692,333 | B2 * | 2/2004 | Kislevitz et al. ............... 446/437 |
| 6,881,122 | B2 * | 4/2005 | Bloch et al. .................... 446/466 |
| 7,018,265 | B2 * | 3/2006 | Ghaly ............................ 446/436 |
| 7,080,014 | B2 | 7/2006 | Bush et al. |
| 2001/0031604 | A1 | 10/2001 | Hornsby et al. |
| 2005/0046751 | A1 | 3/2005 | Simmons |

* cited by examiner

Primary Examiner — Talivaldis Ivars Smits
Assistant Examiner — Shaun Roberts
(74) Attorney, Agent, or Firm — Kyle Fletcher

(57) ABSTRACT

The voice-activated motorized remote control device relates to a motorized remote control, for consumer electronics, with wheels that will drive itself over to an end-user in response to the sound of his or her voice. The voice-activated motorized remote control device will also feature a beeping noise during normal operation and also a high pitched beeping noise that will alert the user if the device has become stuck against an object. The voice-activated motorized remote control device comprises a plurality of wheels; a remote control; a plurality of axles; a microphone; a speaker, a central processing unit with a voice recognition system, and a drive motor.

12 Claims, 3 Drawing Sheets

VOICE-ACTIVATED MOTORIZED REMOTE CONTROL DEVICE

CROSS REFERENCES TO RELATED APPLICATIONS

Not Applicable

STATEMENT REGARDING FEDERALLY SPONSORED RESEARCH Not Applicable

REFERENCE TO APPENDIX

Not Applicable

BACKGROUND OF THE INVENTION

A. Field of the Invention

The present invention relates to a motorized remote control, for consumer electronics, with wheels that will drive itself over to its user in response to the sound of his or her voice.

B. Discussion of the Prior Art

As a preliminary note, it should be stated that there is an ample amount of prior art that deals with remote controls. As will be discussed immediately below, no prior art discloses a remote control that has self-driving capabilities that work in conjunction with voice-recognition means.

The Mozer Patent et al. (U.S. Pat. No. 6,665,639) discloses a voice recognition and response system that can be incorporated into a variety of consumer electronic devices. However, the system disclosed in the Mozer patent is designed to remote control that has mobile capabilities.

The Hornsby et al. Patent Application Publication (U.S. patent application No. U.S. 2001/0031604) discloses an interactive robotic device having a body, a transport mechanism, a drive mechanism and a container for carrying or holding items. However, the robotic device of the Hornsby publication does not disclose a voice activate remote control that can operate audio video electronics such as a television, DVD player, etc.

The Simmons Patent Application Publication (U.S. patent application No. U.S. 2005/0046751) discloses a page function for a remote control. However, the remote control of the Simmons Publication does not include a mobile capability, nor a voice recognition capability that engages the mobile feature of the remote control.

The Pizarro Patent et al. (U.S. Patent Des. 423,510) illustrates an ornamental design for a remote control and paging set, which does not illustrate a mobile capability.

The Chuang Patent (U.S. Pat. No. 5,777,571) discloses a remote control device with voice recognition and user identification restrictions. However, the remote control device of the Chuang patent is limited to the specific purpose of identifying the end user in order to undue or place viewing restrictions when operating a control device.

The Kimura Patent (U.S. Pat. No. 5,267,323) discloses a voice operated remote control system. However, the system of the Kimura Patent does not disclose a remote control with both a mobile capability and a voice recognition system that operates the mobile capability.

The Bush et al. Patent (U.S Pat. No. 7,080,014) discloses a hands free voice-operated remote control transmitter. However, the transmitter of the Bush Patent does not disclose a mobile remote control that drives itself toward a recognized voice pattern, which is programmed into the remote control.

The Thorne Patent (U.S. Pat. No. 6,046,565) discloses a robotic vehicle with a vehicle tracking system, more specifically relating to a suspended carriage system for improved deduced-reckoning of robotic vehicles. However, the robotic vehicle and vehicle tracking system of the Thorne Patent is not capable of being used as a remote control for use with an audio and/or visual devices.

The Fugre-Ramiraz Patent (U.S. Pat. No. 6,573,832) discloses a remote control finder or locating device for finding lost personal items such as keys, television remotes, pagers, and cell phones. However, the remote control finder of the Fugre-Ramiraz patent does not disclose a remote control with an integrated mobile capability that is operated by a voice recognition capability integrated into the remote control.

While the above-described devices fulfill their respective and particular objects and requirements, they do not describe a remote control with an integrated mobile capability that is operated by voice recognition capability integrated into the remote control. In this regard, the voice-activated motorized remote control device departs from the conventional concepts and designs of the prior art.

SUMMARY OF THE INVENTION

The voice-activated motorized remote control device relates to a motorized remote control, for consumer electronics, with wheels that will drive itself over to an end-user in response to the sound of his or her voice. The voice-activated motorized remote control device will also feature a beeping noise during normal operation and also a high pitched beeping noise that will alert the user if the device has become stuck against an object. The voice-activated motorized remote control device comprises a plurality of wheels; a remote control; a plurality of axles; a microphone; a speaker, a central processing unit with a voice recognition system, and a drive motor.

An object of the invention is to provide a remote control that has motorized wheels that can move said remote control.

A further object of the invention is to provide a remote control that has a voice-recognition means integrated into the remote control such that the wheels of the remote control rotate and move the remote control in the direction of the voice recognized therein.

These together with additional objects, features and advantages of the voice-activated motorized remote control device will be readily apparent to those of ordinary skill in the art upon reading the following detailed description of presently preferred, but nonetheless illustrative, embodiments of the voice-activated motorized remote control device when taken in conjunction with the accompanying drawings.

In this respect, before explaining the current embodiments of the voice-activated motorized remote control device in detail, it is to be understood that the voice-activated motorized remote control device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the voice-activated motorized remote control device.

It is therefore important that the claims be regarded as including such equivalent construction insofar as they do not depart from the spirit and scope of the voice-activated motorized remote control device. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
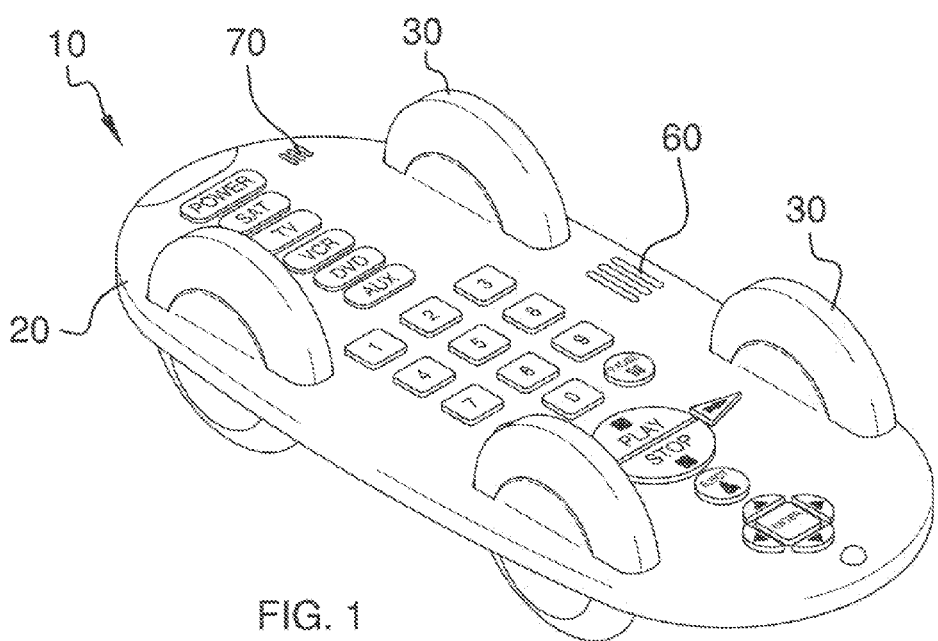
FIG. 1 illustrates a top, isometric view of the voice-activated motorized remote control device, and detailing all of the buttons typically associated with a remote control, albeit a universal remote control, as well as the speaker and microphone.
Figure 2:
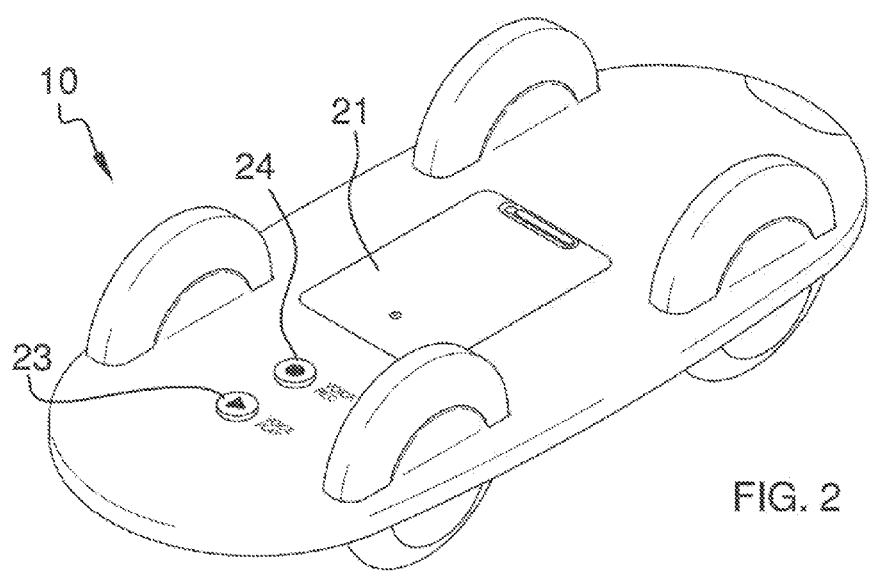
FIG. 2 illustrates a bottom, isometric view of the voice-activated motorized remote control device, and detailing the battery compartment and buttons associated with operating the voice-recognition means.
Figure 3:
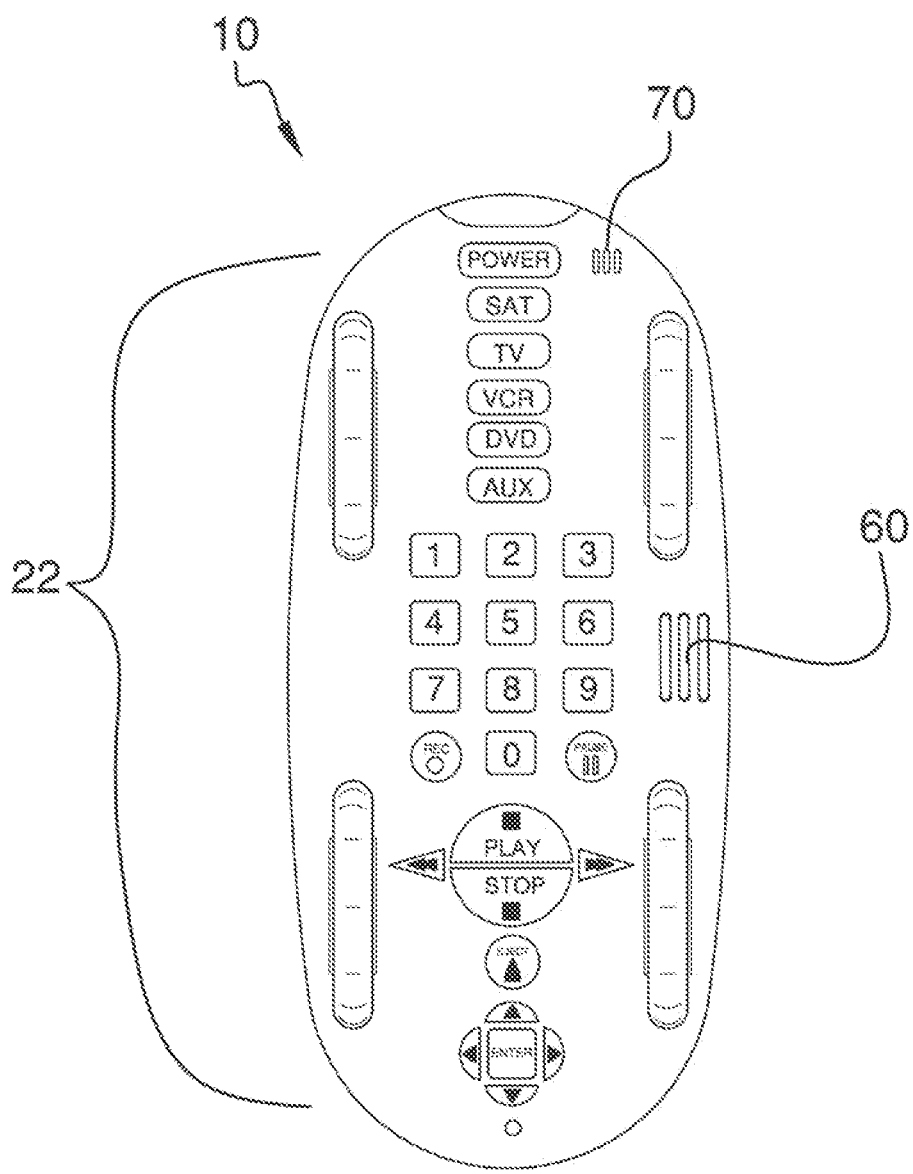
FIG. 3 illustrates a top view of the voice-activated motorized remote control device.

Detailed reference will now be made to the present invention, examples of which are illustrated in FIGS. 1-5. A motorized remote control unit 10 (hereinafter invention) which includes a remote control 20, a plurality of wheels 30; a plurality of axels 40, a plurality of motors 50, a speaker 60, a microphone 70, and a central processing unit 80 (hereinafter CPU or processing means). A motorizing means comprises both the plurality of axels 40 and the plurality of motors 50.

The bottom side of the remote control 20 contains a battery compartment 21, a voice play button 23, and a voice record button 24. The top side of the remote control 20 contains the microphone 70 and a series of user inputs 22 for operating the features of the remote control 20. Located within the remote control 20 are the drive motors 50.

The CPU 80 contains voice recognition software that is used via the voice record button 24. To ensure that the voice recorded is clear, the voice play button 23 is Provided.

Figure 4:
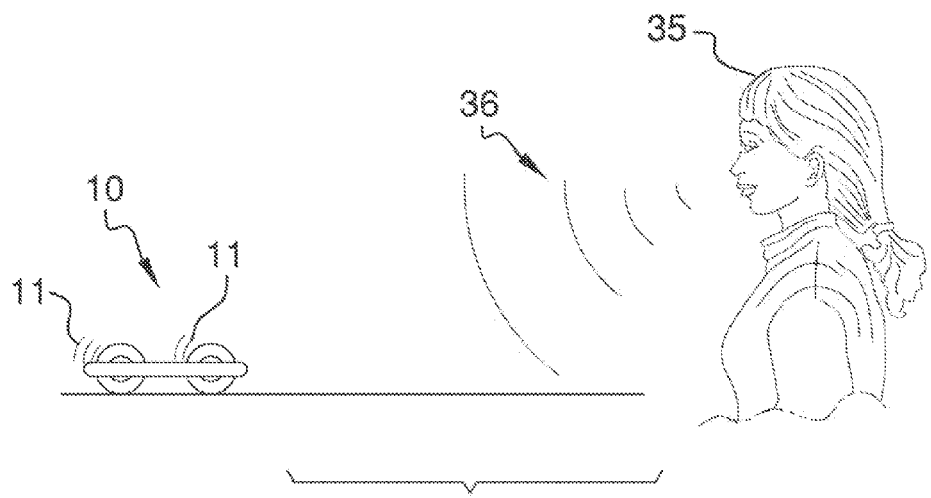
FIG. 4 illustrates the voice-activated motorized remote control device in use by indicating rotational movement of the wheels upon recognition of a pre-recorded voice emanating from an end user.
Figure 5:
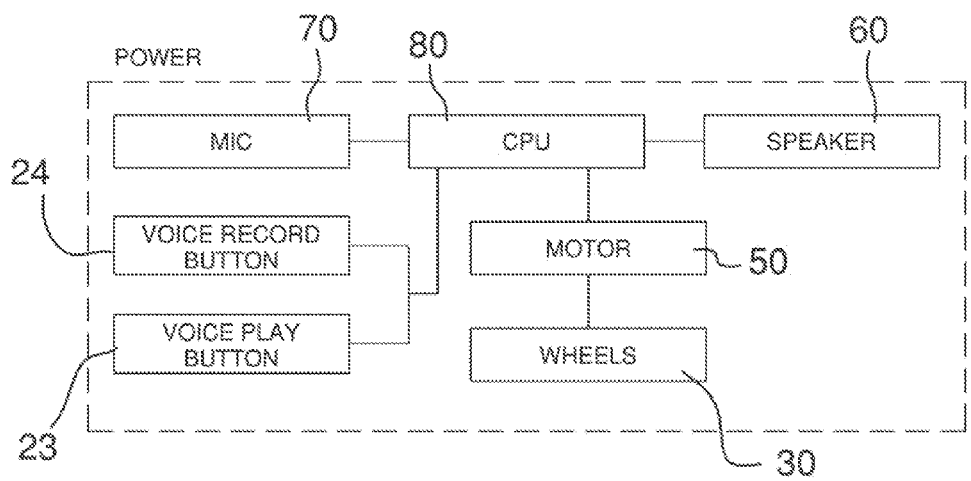
FIG. 5 illustrates a wiring diagram of the various electrical components of the voice-activated motorized remote control device.

FIG. 4 shows the invention 10 in motion wherein a woman 35 is directing her sound waves 36 toward the invention 10 with the wheels 30 in motion 11. The invention 10 is controlled by the CPU 80 which operates the microphone 70, speaker 60, drive motor 50, and wheels 30.

It shall be noted that the CPU 80 is capable of operating the wheels 30 in either direction, such that the invention 10 can move forward, move backwards, turn right, or turn left. It shall be further asserted that this ability of the invention 10 is made possible by the ability of the CPU 80 to compute the strengthening or weakening sound wave of the woman 35 as the invention 10 moves.

Should the movement of the wheels 30 be disturbed whereupon the invention 10 is obstructed by an object, then the CPU 80 shall play a distinct sound signal via the speaker 60 in order to alert the end user that the invention 10 is obstructed from movement.

It shall be noted that a plurality of motors 50 may be required in order to make the accessibility (left, right movement) of the invention 10 feasible.

The CPU 80 also includes voice-recognition capability that enables the CPU 80 to recognize a pre-recorded voice 36 via the voice record button 24, which enables the invention 10 to cancel out other noises that would otherwise confuse the CPU 80.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

While the embodiments of the invention have been disclosed, certain modifications may be made by those skilled in the art to modify the invention without departing from the spirit of the invention.

The inventor claims:

1. A voice-activated motorized remote control device comprising:
    wherein the remote control has a plurality of wheels;
    wherein each wheel is driven by a motorizing means;
    wherein the remote control includes a speaker and a microphone;
    wherein the remote control includes a processing means that receives a signal from a microphone and directs the motorizing means accordingly;
    wherein the processing means can operate the motorizing means in either direction independent of each wheel;
    wherein the processing means computes the strengthening or weakening sound wave of an end user in order to determine what direction to rotate the wheels via the motorizing means.

2. The voice-activated motorized remote control as described claim 1 wherein the motorizing means comprises a plurality of axels and a plurality of motors, wherein each axle is attached between a wheel and a motor.

3. The voice-activated motorized remote control as described in claim 1 wherein the processing means can detect disturbance of the movement of the wheels, and in turn the processing means can play a sound via the speaker in order to alert an end user that the motorized remote control device is obstructed from movement.

4. The voice-activated motorized remote control as described in claim 1 wherein the processing means comprises a central processing unit (hereinafter CPU).

5. The voice-activated motorized remote control as described in claim 1 wherein the CPU includes a voice recognition capability further comprising a voice record button and a voice play button; and wherein upon recordation of an individual voice via the voice record button, the voice recognition capability recognizes said voice and directs the motorizing means to transport said remote control in the direction of said voice.

6. The voice-activated motorized remote control as described in claim 5 wherein the voice record button ad the voice play button are located on a bottom surface of said remote control.

7. The voice-activated motorized remote control as described in claim 1 wherein the processing means and the drive motor is powered by a plurality of batteries.

8. A voice-activated motorized remote control device comprising:
   wherein the remote control has a plurality of wheels;
   wherein each wheel is driven by a motorizing means;
   wherein the remote control includes a speaker and a microphone;
   wherein the remote control includes a processing means that receives a signal from a microphone and directs the motorizing means accordingly;
   wherein the processing means can operate the motorizing means in either direction independent of each wheel;
   wherein the processing means computes the strengthening or weakening sound wave of an end user in order to determine what direction to rotate the wheels via the motorizing means;
   wherein the processing means includes a voice recognition capability further comprising a voice record button and a voice play button; and wherein upon recordation of an individual voice via the voice record button, the voice recognition capability recognizes said voice and directs the motorizing means to transport said remote control in the direction of said voice;
   wherein the processing means can detect disturbance of the movement of the wheels, and in turn the processing means can play a sound via the speaker in order to alert an end user that the motorized remote control device is obstructed from movement.

9. The voice-activated motorized remote control as described in claim 8 wherein the motorizing means comprises a plurality of axels and a plurality of motors, wherein each axle is attached between a wheel and a motor.

10. The voice-activated motorized remote control as described in claim 8 wherein the processing means comprises a central processing unit (hereinafter CPU).

11. The voice-activated motorized remote control as described in claim 8 wherein the voice record button ad the voice play button are located on a bottom surface of said remote control.

12. The voice-activated motorized remote control as described in claim 8 wherein the processing means and the drive motor is powered by a plurality of batteries.

\* \* \* \* \*